UNITED STATES PATENT OFFICE.

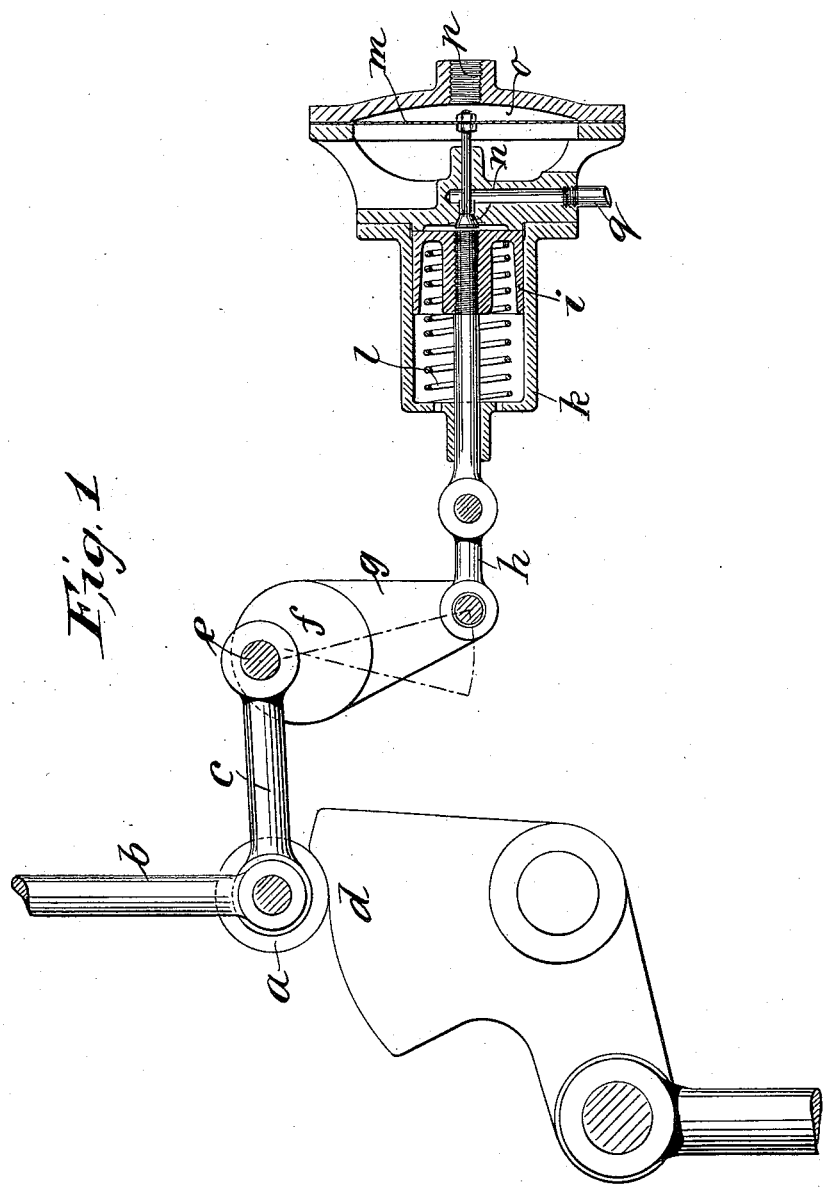

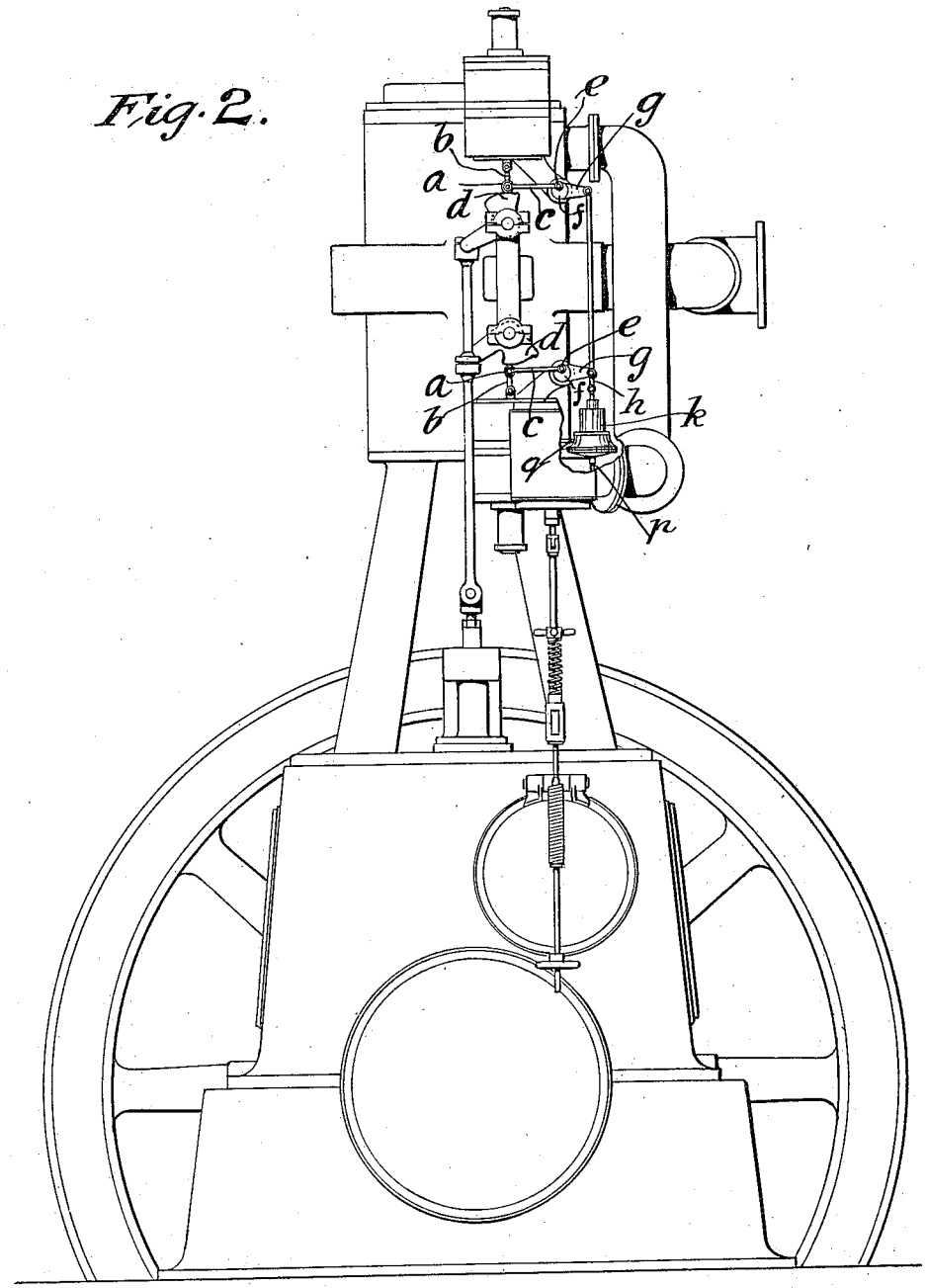

JOHN DAVIDSON, OF PENDLETON, AND WILLIAM OLIVER LARMUTH, OF SALFORD, ENGLAND.

VALVE-GEAR FOR STEAM-ENGINES.

1,033,676. Specification of Letters Patent. Patented July 23, 1912.

Application filed June 12, 1911. Serial No. 632,713.

*To all whom it may concern:*

Be it known that we, JOHN DAVIDSON and WILLIAM OLIVER LARMUTH, subjects of the King of Great Britain, residing at Pendleton and Salford, respectively, both in the county of Lancaster, Kingdom of Great Britain, have invented certain new and useful Improvements in Valve-Gear for Steam-Engines; and we do hereby declare the following to be a full, clear, and exact description of the invention, such as will enable others skilled in the art to which it appertains to make and use the same.

This invention relates to improvements upon an invention for which an application for Letters Patent John Davidson one of the applicants has made for improvements in valve gear in high speed vertical engines of the type in which drop valves, combined drop and piston valves or simple piston valves are employed, said improvements being for the purpose of enabling the valves to be actuated direct from the crank shaft. In the said invention the valve is connected to a plunger, and a roller is fitted on the bottom end of a plunger, said roller resting on a cam formed on one end of a pivoted lever, whose opposite end is fitted on the rod of an eccentric that is fitted on the crank shaft.

In practice it has been found that in the case of engines with cylinders arranged to exhaust in the center by the piston uncovering ports, it is necessary to provide a means for relieving the compression pressure when the vacuum fails and the engine has to exhaust to atmosphere.

The object of our invention is to provide means for causing the steam admission valves to automatically open just at the moment the compression pressure reaches the initial steam pressure, and letting the piston deliver the steam into the steam chest which necessitates increasing the lead of the valve. We attain this object by the means illustrated in the accompanying two sheets of drawings in which—

Figure 1 shows a part sectional side view of the device on an enlarged scale, and Fig. 2 shows an elevation of an engine provided with the said device.

Similar letters refer to similar parts throughout the several views.

In carrying out our invention and referring to the drawing, in lieu of rigidly connecting the roller $a$ to the said plunger, it is attached to the same by a link $b$, and caused to be moved so as to catch the raised portion of the cam $d$ earlier and thereby open the valve earlier by connecting said roller to one end of a link $c$, whose opposite end is eccentrically pivoted at $e$ on a shaft $f$ which is connected by a crank $g$ and link $h$ to the piston $i$ of a small cylinder $k$, which when working under normal conditions is retained at one end of the cylinder by a spring $l$. Attached to the end of the cylinder $k$ or in any convenient position is a diaphragm $m$ coupled to a valve $n$ in the cylinder $k$. One side of the diaphragm $m$ closes a suitable chamber $o$ which is connected to the exhaust pipe of the engine at $p$ and the other is open to the atmosphere. At one end of the cylinder $k$ between the valve and the diaphragm is connected an oil pressure main, or steam pipe $q$ or any suitable fluid pressure. When the vacuum is good the pressure of the atmosphere will keep the valve $n$ closed, but immediately it fails the pressure of oil or steam or other fluid will open the valve $n$ and enter the cylinder and cause the piston $i$ to move to the other end, and by means of the link $c$ will cause the valve of the engine that is actuated by the roller $a$ and cam $d$ to open earlier as already described. By these means when as a result of the vacuum failing in uniflow steam engines, the compression greatly increases the lead of the main valve, and the steam is returned to the chest immediately it is equal in pressure.

We do not confine ourselves to the precise construction shown on the drawing as this may be modified without departing from our invention.

We claim:

1. In a steam engine valve gear, a steam admission valve spindle, a link on the said spindle, an admission valve operating cam acting directly on the said link, means for altering the position of the said link in relation to the said cam, a piston connected to the said means, a cylinder around the said piston, a valve controlling the inlet of steam to the said piston, and a diaphragm one side of which is in communication with the atmosphere and the other side with the exhaust steam for controlling the said valve, substantially for the purpose set forth.

2. In a steam engine valve gear, a steam admission valve spindle, an admission valve operating cam acting directly on the said link, a rod connected to the said link, a shaft, an eccentric pin on the said shaft and connected to the said rod, a crank on the said shaft, a connecting rod connected to the said crank, a piston rod connected to the said connecting rod, a piston connected to the said piston rod, a cylinder around the said piston, a spring inside the said cylinder, and pressing against one side of the said piston, a valve in the said cylinder for controlling the inlet of live steam, a pipe connecting the said valve with the live steam, and a diaphragm one side of which is in communication with the atmosphere and the other with the exhaust steam for controlling the said valve, substantially for the purpose set forth.

In testimony whereof we have affixed our signatures in presence of two witnesses.

JOHN DAVIDSON.
WILLIAM OLIVER LARMUTH.

Witnesses:
FERDINAND B. BOSSHARDT,
STANLEY E. BRAMALL.

Copies of this patent may be obtained for five cents each, by addressing the "Commissioner of Patents, Washington, D. C."